Jan. 10, 1928.

1,655,546

A. HOLLANDER

CASING FOR FLUID PRESSURE APPARATUS

Filed Feb. 3, 1926   2 Sheets-Sheet 1

Inventor.
Aladar Hollander
By George J Henry
Attorney.

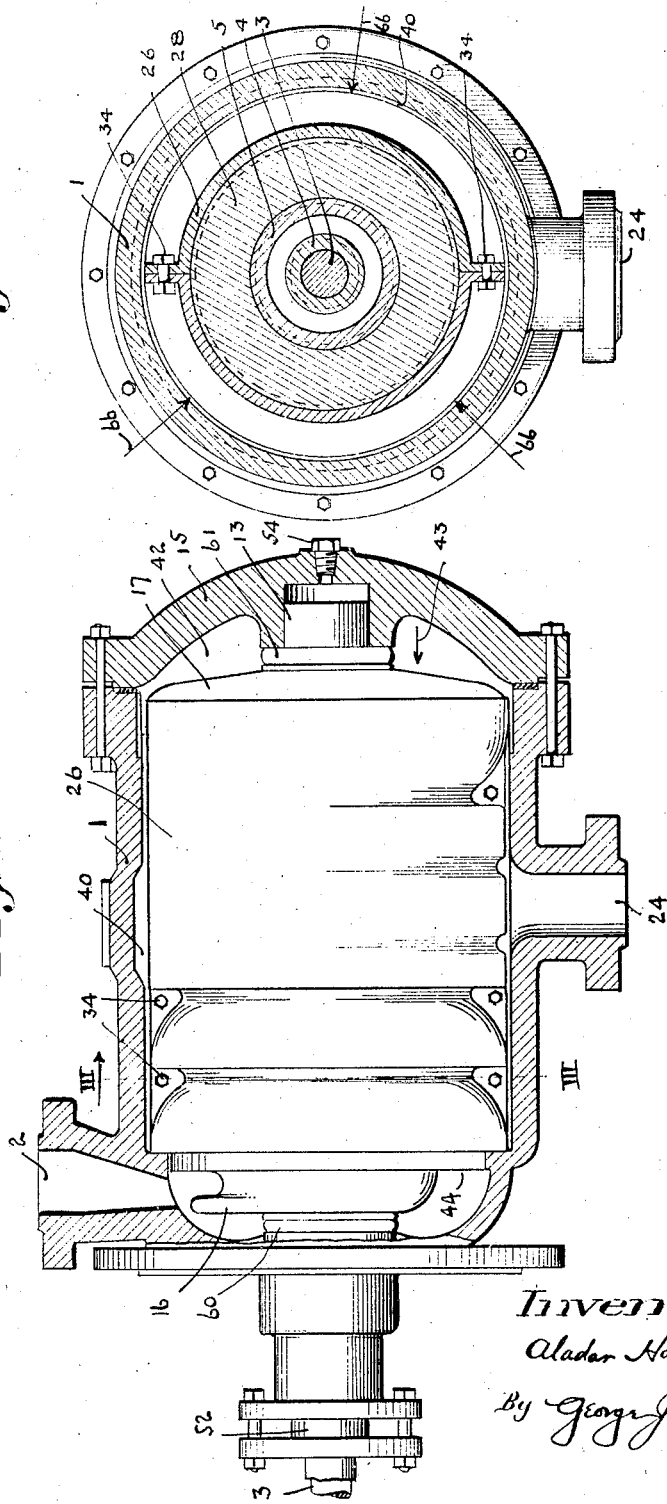

Patented Jan. 10, 1928.

1,655,546

UNITED STATES PATENT OFFICE.

ALADAR HOLLANDER, OF BERKELEY, CALIFORNIA, ASSIGNOR TO BYRON JACKSON PUMP MFG. CO., A CORPORATION OF CALIFORNIA.

CASING FOR FLUID-PRESSURE APPARATUS.

Application filed February 3, 1926. Serial No. 85,629.

My invention is particularly adapted to multi-stage centrifugal pumps, although it may be used for other fluid pressure apparatus, such as steam turbines, water wheels, and the like, where different pressures are available and where impellers are employed within a casing.

One of the objects of my invention is to provide casing elements for fluid impellers and employing fluid pressure to retain under compression the inner casing surrounding the impellers.

Where my invention is applied to centrifugal pumps I employ the discharge pressure therefrom between the casings for such fluid pressure.

Another object of my invention is apparatus of the character described wherein large machined surfaces, or large diameter machine cuts are avoided.

Another object is an apparatus of the character described with the assemblage of several parts in such manner as to minimize expansion and contraction troubles developed from temperature differences as for example where hot oil is the fluid employed.

Another object is a cheaper and more efficient construction in apparatus of the character described.

Other objects will appear in the drawings and specifications which follow.

These objects I attain by mounting the runners or impellers upon a shaft and within an inner casing and then enclosing the inner casing within and spaced from a pressure resisting outer casing and then introducing between the two casings a fluid pressure from the high pressure side of the runners or impellers and thus employing the pressure difference between the suction side and the discharge side of the runners or impellers as a fluid pressure to force together the several parts of the inner casing, which is thus exposed to compression strains rather than bursting strains as heretofore.

By referring to the accompanying drawing, my invention will be made clear.

Fig. 2 is similar to Fig. 1 except that the inner casing is shown in view and is shown with a longitudinal parting joint at the plane of the axis of rotation.

Fig. 3 is a cross section of Fig. 2 on the line III—III thereof.

Throughout the figures similar numerals refer to identical parts.

Figure 1:
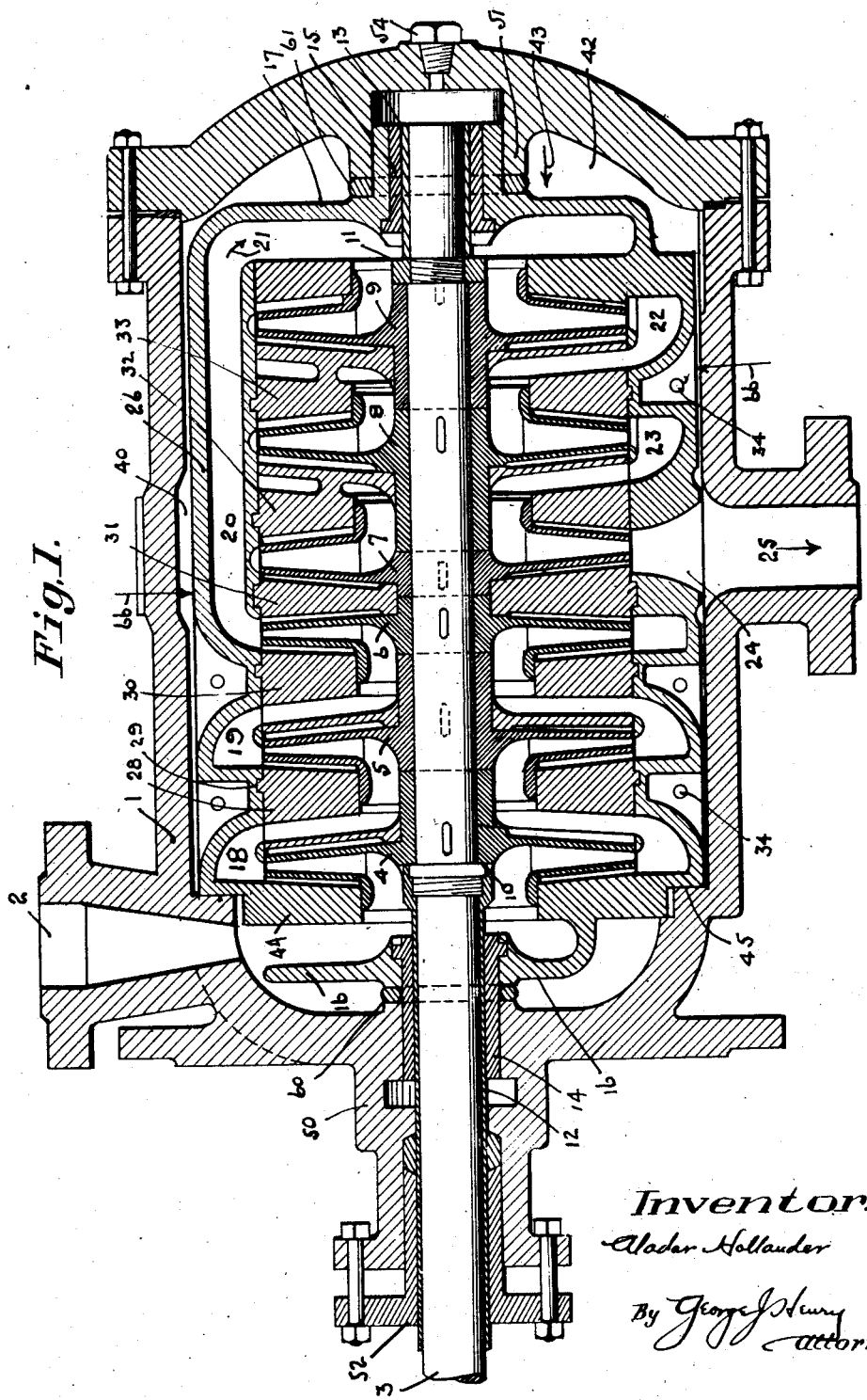
Fig. 1 is a longitudinal cross section through a multi-stage centrifugal pump employing my invention.

The numeral 1 indicates the external or outer casing adapted to withstand an internal fluid pressure in excess of the maximum discharge pressure of the pump.

At 2 is a suction inlet and at 3 a main driving shaft which may be driven by any conventional means and has mounted thereon runners or impellers 4, 5, 6, 7, 8, 9 respectively.

These impellers are assembled upon the shaft with keys or splines and abut against the shoulder 10 and are held in their assembled position by the nut 11 engaging threads upon the shaft.

I prefer to make the shoulder 10 and the nut 11 integral with the sleeves 12, 13 respectively on the shaft 3, which sleeves form a journal surface within the end bearings 14, 15, the latter formed within the heads 16, 17 for supporting the main shaft 3.

From the several impellers there are appropriate discharge passages, as from the outside of the low stage impeller 4, passage 18 leads the fluid to the suction side of the runner 5 thence discharged through the passageway 19 to the suction side of runner 6. From runner 6, the discharge is conveyed through the passageway 20 over and around the end of the casing and in the direction of the arrow 21 and to the inlet of the runner 9.

In the runner 9 the discharge passes through passage 22 thence to the suction of runner 8 thence through passage 23, thence to the suction side of runner 7 and is discharged as high pressure fluid at the outlet 24 from the inner casing 26 and finds access to the space 40 between the casings and thence as indicated by the arrow 25 from the outer casing 1.

The several passages 18 to 23 inclusive are formed in the inner casing which is generally indicated by the numeral 26 and which is provided with the head 17 on one end and the head 44 at the other end.

This inner casing 26 is preferably made in two halves as best shown in Figs. 2 and 3 and its interior portion is bored out to receive the several intermediate discs or guide vane members between the runners.

The guide vane member between runners 4 and 5 is indicated at 28 and is provided with a flange or tongue connection between its periphery and the interior of the casing 26 as shown at 29 so that when the two halves of the casing 26 are assembled over the member 28 a groove in 26 receives the tongue 29 so that the member 28 is held in fixed relation with respect to the runners on either side thereof.

Similar guide vane members are shown at 30, 31, 32 and 33 between the other runners respectively and the two halves of the inner casing 26 are preferably bolted together on a longitudinal plane joint as shown by the holding bolts 34, 34.

The outer diameter of the casing 26 is less than the inner diameter of the casing 1, whereby the fluid pressure space or chamber 40 is formed and this chamber is adapted to receive the discharge pressure from the inner casing at 24 which now finds its way about the entire external surface of the inner casing 26, and within the outer casing 1 and into the end space 42.

This discharge pressure is in excess of any of the pressures inside of the inner casing 26 and consequently there will be exerted on the outer surface of the said inner casing, pressures tending to collapse or to compress all of the said inner casing parts towards the center indicated generally by arrows 66, and from the end chamber 42 pressure will be exerted in the direction of the arrow 43 forcing the said inner casing as an assembled unit against the outer casing portion at the joint 45 of the main casing 1.

The bearings 14 and 15 telescope within sleeve portions of the outer casing as shown at 50, 51 respectively.

Conventional packing means may be provided as at 52 and plug at 54 to facilitate the operation in assembling and adjusting the parts.

Expansion members or elastic packing is shown at 60, 61 for holding the inner casing 26 normally tight against the outer casing 1 at the joint 45 when no inner pressures are being developed as for assembling and transportation.

The operation is as follows:

Assuming that hot oil is being pumped, the said oil enters through the connection 2, is forced by the runners 4, 5, 6, 9, 8, 7, successively from the low pressure to the discharge pressure at 24. This discharge pressure fills the chamber 40 within the outer casing 1 and exerts a compression against the entire exposed surfaces of the inner casing 26 and head 17 as indicated by the arrows 66, 66 and 43 respectively.

This forces the two halves of the inner casing in compression and also holds in compression the surfaces 45, 46, holding in fact all of the several parts of the inner casing under heavy compression and subjecting only the exterior casing 1 to the tension strains from the discharge pressure which is communicated to the chamber 40.

The variations in temperature of the hot oil cause a variation in the expansion and contraction of the inner casing with respect to the outer casing and at such times a relative movement takes place between the parts without disturbing the assembled relationship of the several parts or the operation of the shaft and impeller means, the said expansion and contraction being compensated for by slight movements in the elastic packing at 60, 61. This packing performs the function of retaining the parts in their assembled relation at such times as there is no discharge pressure being generated by the apparatus.

It will now be seen that the outer casing 1, is an extremely simple one to mold, to cast and to machine.

All of the intricate molding and casting work is done on the inner casing portions all of which are subjected to compression strains as distinguished from tension strains.

Smaller cross sections and hence a less weight of metal may therefore be employed in these inner casing portions and relatively little machine work is necessary on them.

The alignment of the shaft with the inner casing portions is at all times maintained regardless of expansion or contraction, thus avoiding temperature displacement troubles so often met with in large centrifugal apparatus.

Although I have described my invention as applicable to a centrifugal pump, it will now be seen that it may be employed with equal facility where pressure fluid is admitted at 24 and discharged at 2, as would be the case where apparatus of this general type is employed to generate power from falling water and in such case the higher pressure would also function through the chamber or spaces 40, 40 and 43 to compress the several parts of the inner casing and hold them bound in tight operative relationship.

The gist of the invention is the maintenance of a pressure between an outer shell and an inner casing wherein is contained impeller means said pressure establishing compression exerted in the material of the inner casing.

Particular attention is directed to the fact that the inner casing with its impellers and enclosed parts forms a complete centrifugal pump, and is to be fully assembled before introduction into the outer casing, into which it is then inserted as a unit structure and the outer casing is an additional structural element having a seat for the pump to separate the inlet and outlet pressures and when all assembled and operated the discharge pressure from the centrifugal pump is established and maintained around the inner casing and against the end of the inner casing, thus causing a compression stress towards the suction end and which stress is in excess of the internal pressures of the pump. There are therefore no resultant stresses to cause a separation between the different pump stages, these being held by the excess compression against the end of the pump.

I claim:

1. In a centrifugal pump, an inner casing, an outer casing having an open end, a removable cover for said open end, said casings being spaced circumferentially, a fluid inlet to each of said casings, a discharge passage from said inner casing communicating with the space between said casings, a discharge outlet in said outer casing communicating with said space, impeller means within the inner casing and a shaft on which said impellers are mounted, a shaft bearing on said inner casing and a second shaft bearing in said outer casing and closure means between said space and said inlets comprising contacting machined surfaces on said casings and an elastic compression member interposed between said casings establishing an initial compression between said surfaces.

2. In hydraulic pressure apparatus an outer casing and an inner casing mounted in said outer casing, said casings being spaced circumferentially, impeller means within said inner casing, an inlet in said outer casing, a suction port and an outlet port in said inner casing, said outlet port discharging into said space whereby pumped fluid pressure is established externally on said inner casing, a discharge port from said outer casing communicating with said space, sealing means between the casings closing said inlets from said space and an elastic member interposed between the casings at the end opposite said sealing means.

3. In hydraulic pressure apparatus an outer casing and an inner casing mounted therein, said casings being spaced circumferentially, a shaft and impeller means in said inner casing, said inner casing made parting on a plane through said shaft axis, an inlet port to each of said casings and an outlet port from said inner casing communicating with said space whereby pumped fluid pressure is established in said space external to said inner casing, a discharge port for said fluid pressure from said outer casing, sealing means between said casings at one end closing said inlets from said space and an elastic member interposed between the other end portions of said casings.

4. In a fluid pressure pump a main shaft, impeller means on said shaft, a casing enclosing said impeller means, a housing enclosing and spaced from said casing, a suction inlet to said casing adjacent one end portion of said shaft, a stuffing gland around said shaft portion, an outlet from said casing communicating with said space and a corresponding outlet through said housing, an end bearing for the other end of said shaft entirely enclosed within said housing, and an end seat in said housing adjacent said inlet and against which said casing is seated.

ALADAR HOLLANDER.